(12) United States Patent
Crome et al.

(10) Patent No.: US 6,450,943 B1
(45) Date of Patent: Sep. 17, 2002

(54) APPARATUS FOR AND METHOD OF COMBATING THE GRAVITY PUSH-PULL EFFECT EXPERIENCED BY AN AIRMAN WEARING A FLIGHT SUIT

(75) Inventors: Victor P. Crome, Davenport; Russell F. Hart, Blue Grass, both of IA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/484,449

(22) Filed: Jan. 18, 2000

(51) Int. Cl.⁷ .............................. B64D 47/00; B64G 9/00
(52) U.S. Cl. ............................................ 600/19; 2/2.14
(58) Field of Search ........................ 600/19–20; 2/2.14; 137/81.1, 48

(56) References Cited

U.S. PATENT DOCUMENTS

| | | |
|---|---|---|
| 3,734,078 A | 5/1973 | Cramer et al. |
| 4,215,712 A | 8/1980 | Shaffstall et al. |
| 4,219,039 A | 8/1980 | Jaggars |
| 4,230,097 A | 10/1980 | Beaussant et al. |
| 4,534,338 A | 8/1985 | Crosbie et al. |
| 4,583,522 A | 4/1986 | Aronne |
| 4,638,791 A | 1/1987 | Krogh et al. |
| 4,736,731 A | 4/1988 | Van Patten |
| 4,799,476 A | 1/1989 | McGrady |
| 4,895,320 A | 1/1990 | Armstrong |
| 4,906,990 A | 3/1990 | Robinson |
| 5,226,410 A | 7/1993 | Fournol |
| 5,269,295 A | 12/1993 | Foote et al. |
| 5,277,693 A | 1/1994 | McCollor et al. |
| 5,498,161 A | 3/1996 | Noble, Jr. |
| 5,536,232 A | 7/1996 | Farrell et al. |
| 6,217,506 B1 * | 4/2001 | Phillips et al. ................ 600/19 |

* cited by examiner

Primary Examiner—John P. Lacyk

(57) ABSTRACT

An anti-G system is used to combat the push-pull effect experienced by airmen during and after a transition from a period of low or negative G force levels to high G force levels. The anti-G system includes an anti-G controller configured to receive signals indicative of airman acceleration and anti-G garment pressure. The anti-G controller is coupled to a valve controller controlling fill and vent valves controlling the pressure level in the anti-G garment. As the anti-G controller receives acceleration signals indicating G force levels over time, the controller calculates whether the anti-G garment pressure should be increased or decreased and transmits signals to the valve controller to increase or decrease anti-G garment pressure. Increasing the anti-G garment pressure compensates for the airman's loss of tolerance to high G levels immediately after exposure to a period of low or negative G levels.

45 Claims, 2 Drawing Sheets

APPARATUS FOR AND METHOD OF COMBATING THE GRAVITY PUSH-PULL EFFECT EXPERIENCED BY AN AIRMAN WEARING A FLIGHT SUIT

FIELD OF INVENTION

The present invention relates generally to an apparatus for and a method of increasing the ability of airmen flying in aircraft to resist gravity (G force) induced loss of consciousness (GLOC), and more particularly, to reducing the likelihood of gravity induced loss of consciousness resulting from when the airmen in the aircraft experiences a transition from a period of less than normal G force acceleration to greater than normal G force acceleration.

BACKGROUND ART

A phenomenon called the push-pull effect occurs when an airman is exposed to a period(s) of low or negative G forces followed immediately by a period(s) of positive G forces. The push-pull effect reduces an airman's G force tolerance, and can surprise the unaware and unprotected airman with fatal results.

During flight, an airman is exposed to less than the normal baseline of 1 G force, e.g., 0 to −1.0 G. During this exposure, blood is "pushed" to the airman's head resulting in increased blood pressure in the airman's upper body. Natural physiological responses attempt to reduce the airman's blood pressure to normal levels by reducing the heart rate and dilating blood vessels to lower cerebral blood pressure.

If the airman is unable to compensate using natural physiological response and if the blood pressure increases too much, a condition known as "redout" can occur. Redout or red vision can occur at as little as two or three negative G forces causing blood vessels in the eye to rupture. Physiological investigations have reported that the parasympathetic nervous system senses the high blood pressure and automatically lowers the blood pressure by reducing the heart rate in two to four seconds and dilating blood vessels in five to seven seconds, if the low or negative G forces continue long enough. The parasympathetic nervous system returns body functions to normal after being altered by sympathetic stimulation. The sympathetic nervous system prepares the human body for violent activity in times of danger.

Upon transitioning from low or negative G forces to high G forces, the airman's cerebral blood pressure decreases below normal as blood is "pulled" from the airman's head. The sympathetic nervous system responds by increasing the heart rate in about six to eight seconds and constricting the blood vessels in about seven to fifteen seconds in an attempt to increase cerebral blood pressure.

By dramatically decreasing cerebral blood pressure and oxygen available to the brain, high G forces cause G force induced loss of consciousness or blackout. As the G forces increase, the airman experiences tunnel vision and loss of color vision. If the airman is unprepared and cerebral blood pressure is allowed to fall dramatically at high, positive G forces, the airman may lose consciousness within five to seven seconds. The brain has only five to seven seconds of latent oxygen available. If the airman is not properly protected or does not take corrective action, blackout will occur.

An airman experiences both low or negative G forces and high G forces while performing maneuvers in high performance fighter aircraft involving rapid change in direction and velocity. There exist numerous prior art approaches for dealing with high G forces and physiological effects leading to blackout in airmen. Two successful approaches for increasing the airman's high G tolerance prevent pooling of blood in the lower extremities and force blood flow to the upper body.

The first prior art approach is a straining or tensing maneuver performed by the airman. Example anti-G straining maneuvers include the Valsalva, "Q", "HOOK", M-1, and L-1 maneuvers. These maneuvers increase the overall hydrostatic pressure in the airman's intravascular system and can enhance G force tolerance by approximately three Gs.

The second prior art approach is the use of a pressurized anti-G garment worn by the airman. The anti-G garment or G-suit is primarily a series of balloons within a pair of pants worn by the airman. Pressure filling the balloons squeezes the legs and abdomen of the airman reducing the amount of blood forced away from the head into the legs. An anti-G garment can enhance G force tolerance by approximately one and a half to two Gs.

An explanation of the use of the anti-G garment follows. The pressure applied to the lower anti-G garment worn by the airman to combat high G force is customarily defined by Equation 1 below, up to a maximum of eleven pounds per square inch (PSI) at nine G's. In Equation 1, Gz represents the amount of G force experienced by the airman and P is the pressure to be applied to the anti-G garment to combat the effects of the high positive G force.

$$P = 1.5 \; PSI*(Gz - 1.667) \qquad \text{Equation (1)}$$

Equation 1 is based upon empirical evidence of the human body's physiological response to increasing G force levels from a baseline of 1.0 G. This approach does not address the effect on the airman of a transition from negative G force, where blood pressure is increased and blood is "pushed" to the head, to positive G force, where blood pressure is decreased and blood is "pulled" from the head, previously referred to as the push-pull effect.

Separately, either of these phenomena, high G force or low G force, can have a significant negative, if not deadly, impact on an airman; however, when combined in a maneuver transitioning from low G to high G, the impact of high G force on the airman is increased. Due to the physiological reactions to low G periods, the onset of blackout during a subsequent high G period occurs at a lower high G level. The human body's tolerance for high G forces is reduced by exposure to low G force levels immediately preceding the high G forces, because of the way blood is "pushed" to the brain during low G periods and "pulled" from the brain during high G periods.

The push-pull effect is highlighted by the recent fatal crash of a Canadian CF-18 airplane. The crash occurred after the airmen experienced moderate positive G force levels following negative G force exposure. Telemetry sent throughout the flight indicated that the cause of the crash was the push-pull effect. Other aircraft incidents are suspected to be the result of the push-pull effect. This phenomenon is known and has been experienced by airmen in the aerobatic pilot community.

Additionally, the physique of an individual affects their ability to withstand G forces. Tall persons experiencing G forces are more susceptible to blackout than short persons experiencing the same G forces because the heart of the tall person has to pump blood farther to the brain than the heart of the short person. Therefore, there is a need in the art to be able to tailor the response of the anti-G garment to a specific individual's physique.

An advantage of solving this problem is the reduction or elimination of accidents resulting from the push-pull effect, as well as providing a significant tactical advantage to protected airmen during combat maneuvers. New combat maneuvers incorporating low or negative G force levels will improve survivability of airmen and aircraft. Therefore, there is a need in the art to reduce the likelihood of loss of consciousness resulting from a transition from a period of less than normal G force to greater than normal G force. Furthermore, it would be particularly desirable to retrofit an existing aircraft with the necessary hardware and software to control an anti-G garment without requiring additional processing by aircraft computers.

SUMMARY OF THE INVENTION

Accordingly, an object of the present invention is to compensate for the push-pull effect experienced by airmen during flight maneuvers.

Another object of the present invention is to increase an airman's tolerance during flight maneuvers to the push-pull effect.

Yet another object of the present invention is to reduce the likelihood of an airman experiencing gravity induced loss of consciousness when transitioning from low G to high G during flight maneuvers.

Another object is to avoid the use of existing aircraft computers and use an anti-G garment to compensate for the push-pull effect.

Still another object of the present invention is to tailor the response of an anti-G garment to a specific individual.

The present invention is an apparatus for and a method of reducing the push-pull effect experienced by airmen during and after a transition from a period of low or negative G force levels to high G force levels. The invention includes an anti-G controller configured to receive signals indicative of airman acceleration and anti-G garment pressure. The anti-G controller is coupled to an valve controller controlling the fill and vent valves controlling the pressure level in the anti-G garment. As the anti-G controller receives acceleration signals indicating G force levels as a function of time, the controller calculates whether the anti-G garment pressure should be increased or decreased. Increasing the anti-G garment pressure compensates for the airman's loss of tolerance to high G levels immediately after exposure to a period of low or negative G levels.

In a method aspect of the present invention, pressure in an anti-G garment is controlled using a valve controller for increasing and decreasing the pressure in the anti-G garment coupled with a processor with memory. The memory is capable of receiving signals representing acceleration and garment pressure. The method comprises the steps of storing acceleration signals received in memory and increasing the pressure in the anti-G garment in response to a transition from a period of less than normal acceleration to greater than normal acceleration.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE DRAWINGS

Figure 1:
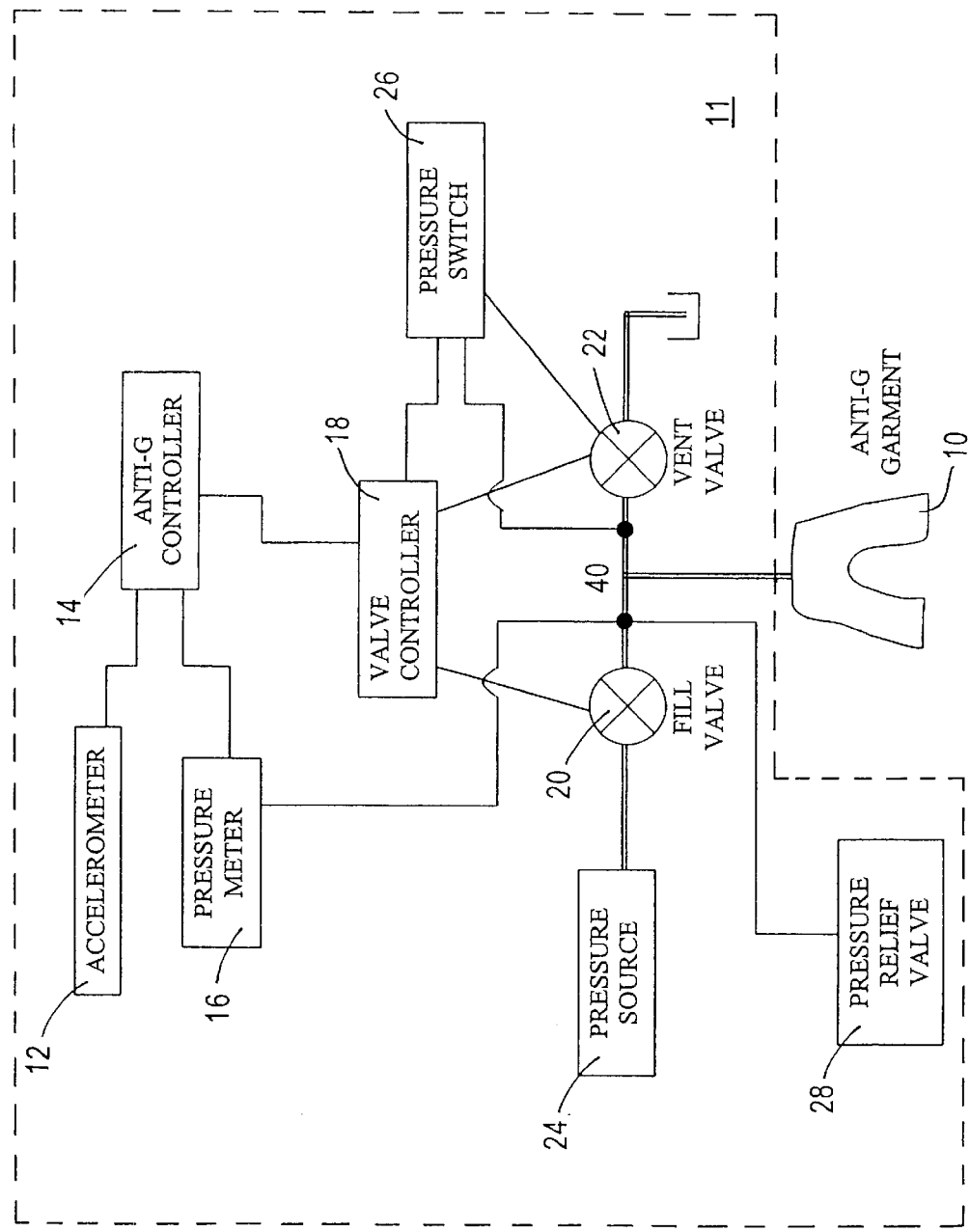
FIG. 1 is a schematic block diagram of the present invention.

Reference is now made to FIG. 1 wherein an anti-G garment 10 is coupled to an anti-G system 11 is worn by an airman (not shown) to increase the airman's tolerance to high G levels during flying maneuvers. The anti-G garment 10 covers the airman's legs and torso with air bladders which automatically inflate during high acceleration maneuvers to compress the blood vessels in those regions and force blood flow to continue to the brain. Hereinafter, the term airman or airmen is used to refer individually and collectively to the pilot and/or aircrew of an aircraft.

The anti-G system 11 includes an accelerometer 12 coupled to an anti-G controller 14, a pressure meter 16 coupled to the anti-G controller 14 and to pressure line 40, anti-G controller 14 coupled to valve controller 18, valve controller 18 coupled to pressure switch 26, fill valve 20 and vent valve 22, pressure switch 26 coupled to pressure line 40 and vent valve 22, pressure line 40 coupled between fill valve 20, vent valve 22 and anti-G garment 10, pressure source 24 coupled to fill valve 20, and pressure relief valve 28 coupled to pressure line 40.

The accelerometer 12 monitors G force levels experienced by the airman and outputs a signal representative of the G force level to the anti-G controller 14. One G is a unit of measurement describing the force a mass experiences from acceleration due to gravity at sea level. The pressure meter 16 monitors the pressure in the anti-G garment 10 and outputs a signal representative of the pressure level to the anti-G controller 14. The anti-G controller 14 receives inputs from the accelerometer 12 and the pressure meter 16 and calculates whether to increase or decrease the pressure in the anti-G garment 10 as a function of G force levels over time. By monitoring the time history of the G force levels, the anti-G controller 14 can properly determine how much to advance the pressure schedule for the anti-G garment 10 to combat the push-pull effect.

The anti-G controller 14 adjusts pressure in the garment 10 by controlling the valve controller 18. The valve controller 18 responds to (1) increase and (2) decrease pressure signals from the anti-G controller 14 by respectively, (1) opening the fill valve 20 and closing the vent valve 22 and (2) closing the fill valve 20 and opening the vent valve 22 controlling pressure in the anti-G garment 10. The fill and vent valves 20 and 22 can be separate electromechanical fill and vent valves 20 and 22 or a dual acting fill and vent valve. The fill valve 20 is connected to the pressure source 24 providing pressurized air for the anti-G garment 10 as is known in the art. All components are mounted on or in the aircraft.

If anti-G garment 10 pressure exceeds a preset limit, a pressure switch 26 causes the valve controller 18 to close the fill valve 20 and open the vent valve 22 allowing venting of excess pressure. Additionally, a pressure relief valve 28 is included as a safety measure in case the garment pressure exceeds a preset limit.

A pressure breathing for G's (PBG) regulator (not shown) may also be included to provide the preferred pressure to a mask and chest counter-pressure garment (not shown). Example PBG regulators include the U.S. Air Force CRU-93 or CRU-98 or the U.S. Navy CRU-103.

Figure 2:
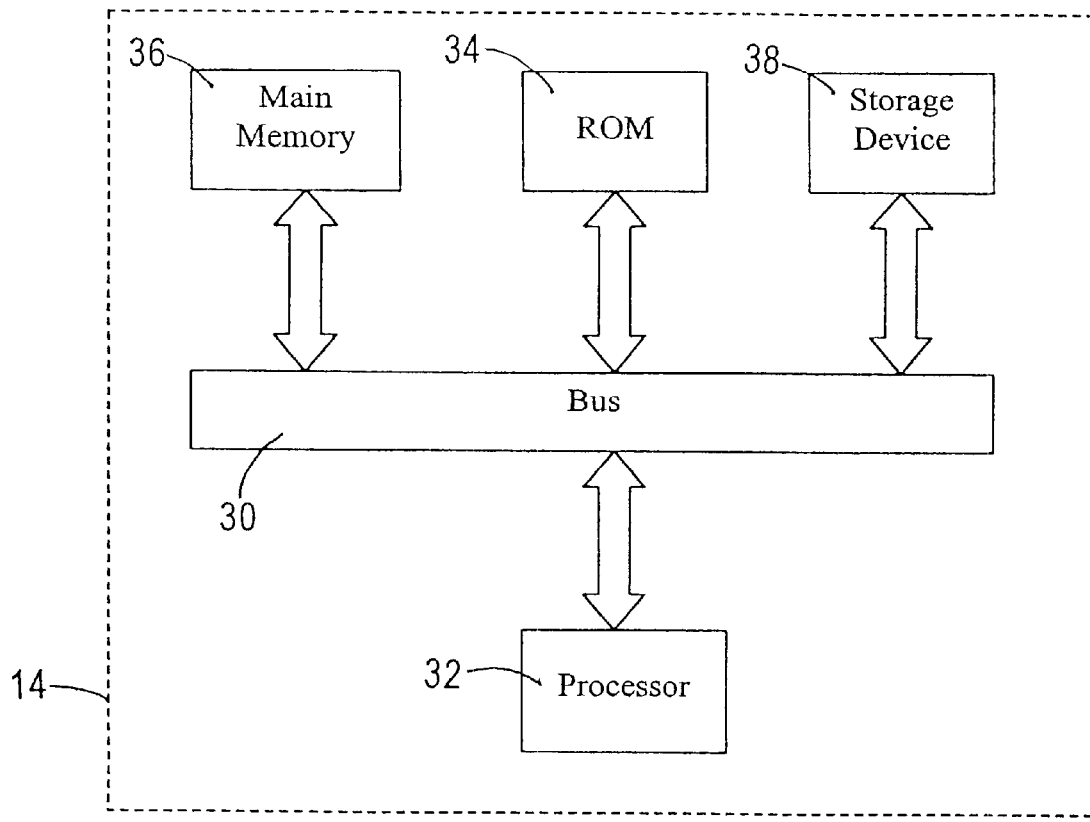
FIG. 2 is a high-level block diagram of circuitry included on an anti-G controller of FIG. 1.

The circuitry of anti-G controller 14, as illustrated in FIG. 2, includes a bus 30 for communicating information and a processor 32 coupled with the bus 30 for processing information. Anti-G controller 14 also includes read only memory 34 (ROM) or other static storage device coupled to bus 30 for storing static information and instructions for processor 32. Anti-G controller 14 further includes main memory 36, such as a random access memory (RAM) or other dynamic storage device, coupled to bus 30 for storing instructions to be executed by processor 32 and signals representing accelerometer 12 and pressure meter 16 inputs over time. Main memory 36 can also be used for storing temporary variables or other intermediate information while processor 32 executes instructions. Storage device 38, such as a magnetic disk or optical disk, coupled to bus 30 stores processing instructions, and signals representing accelerometer 12 and pressure meter 16 inputs.

Activation of valve controller 18 is controlled by processor 32 of anti-G controller 14 executing sequences of instructions contained in main memory 36. Such instructions may be read into main memory 36 from another computer-readable medium, such as storage device 38. However, the computer-readable medium is not limited to devices such as storage device 38. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in main memory 36 causes processor 32 to perform the process steps described below. In alternative embodiments, hard-wired circuitry may be used in place of or in combination with computer software instructions to implement the invention. Thus, embodiments of the invention are not limited to any specific combination of hardware circuitry and software.

In a preferred embodiment, Equation 2 below is stored in instructions in ROM 34 or on storage device 38 and executed by processor 32 to determine the pressure to be set in the anti-G garment 10 after exposure to low or negative G levels followed by positive G levels. In Equation 2, Gz represents the amount of G force experienced by the airman and X is a variable whose value is determined by the time history value of Gz. If no or minimal negative G force is experienced, Gz is greater than 0.5 G, the value of X is set at 0. If the value of Gz is less than 0.5 G for approximately 2 seconds or longer, the value of X is set at 0.5. If Gz is less than 0.0 G for approximately 2 seconds or more, the value of X is set at 1.0, and if Gz is less than negative 0.5 G for approximately 2 seconds or more, the value of X is set at 1.5. The maximum value of X is 1.5. P is the pressure to be applied to the anti-G garment 10 to combat the effects of the push-pull effect and high positive G force.

$$P = 1.5 PSI * (Gz - 1.667 + X) \quad \text{Equation (2)}$$

where:

X is normally 0;

If Gz<0.5 G for about 2 seconds or longer, then X=0.5;

If Gz<0.0 G for about 2 seconds or longer, then X=1.0;

If Gz<−0.5 G for about 2 seconds or longer, then X=1.5;

The maximum value of X is 1.5; and

The maximum value of P is 11.0 PSI.

Other equations may be used in place of Equation 2 to counteract the push-pull effect on airmen. It is noted that advancing the pressure schedule to begin at 0.0 G force or below would intensify the body's physiological responses to negative G forces and be compounding the detrimental push-pull effect on airmen during any subsequent positive G force exposure. Advancing the start of applying pressure to anti-G garment 10 to just above 0.0 G force (or about 0.167 G force) is believed to be approximately the most the pressure can be advanced without detrimental effects.

Processor 32 monitors the most recent accelerometer 12 inputs stored in main memory 36. If the accelerometer 12 inputs are less than one half G for longer than about 2 seconds, processor 32 calculates, using Equation 2, the pressure level needed in anti-G garment 10 to combat the push-pull effect. If the accelerometer 12 inputs are less than 0.5 G force, then variable X in Equation 2 is set to 0.5. Accordingly, if accelerometer 12 inputs are less than 0.0 and −0.5 G force, then variable X is respectively, 1.0 and 1.5. Processor 32 compares the calculated pressure with the most recent garment 10 pressure level stored in main memory 36 and calculates the difference. Upon determination of a calculated difference, processor 32 transmits a signal over bus 30 to valve controller 18 to open and close the fill and vent valves 20 and 22.

If the calculated difference indicates that the calculated pressure is greater than the current garment 10 pressure, processor 32 generates an increase pressure signal. If the calculated difference indicates that the calculated pressure is lower than the current garment 10 pressure, processor 32 generates a decrease pressure signal. In response to receiving an increase pressure signal, valve controller 18 closes vent valve 22 and opens fill valve 20 causing the pressure in the anti-G garment 10 to increase. In response to receiving a decrease pressure signal, valve controller 18 closes fill valve 20 and opens vent valve 22 causing the pressure in the anti-G garment 10 to decrease. If the calculated difference between the pressure level input and the calculated pressure level is zero, processor 32 transmits a signal over bus 30 to valve controller 18 to close the fill and vent valves 20 and 22. Processor 32 continues monitoring the accelerometer 12 and pressure meter 16 inputs.

If the pressure in the anti-G garment 10 exceeds a preset limit, the pressure switch 26 causes the valve controller 18 to close the fill valve 20 and open the vent valve 22 allowing the excess pressure to vent.

An example is useful in describing the operation of the anti-G system 11 in conjunction with the anti-G garment 10 of FIG. 1. As the airman wearing the anti-G garment 10 experiences low or negative G force levels, for instance negative 0.2 G for 3 seconds, the accelerometer 12 transmits signals indicating the G force level to anti-G controller 14 for storage in main memory 36 or storage device 38. At this point, zero or nominal pressure is delivered by the anti-G system 11 to anti-G garment 10. After a transition to a period of positive G force levels, for example 1 G, processor 32 calculates the desired garment pressure, using Equation 2, as P=1.5*(1−1.667+1)=0.5 PSI. An increase pressure signal is sent by anti-G controller 14 to valve controller 18. As the acceleration increases to 2 G, processor 32 calculates the desired garment 10 pressure using Equation 2 as P=1.5*(2−1.667+1)=1.9995 PSI. Again, an increase pressure signal is sent to valve controller 18 by anti-G controller 14. Using Equation 1 of prior art approaches, the pressure to be delivered at 2 G would have been P=1.5*(2−1.667)=0.5 PSI. A comparison of the pressure value results from Equations 1 and 2 performed by the anti-G controller 14 reveals that the pressure calculated under Equation 2 is one and a half pounds per square inch greater than the pressure determined by Equation 1. Therefore, the pressure to be delivered under Equation 2 is greater than under Equation 1 compensating for the period of low or negative G force level.

As the airman experiences normal or high positive G force but not preceded by a low or negative G force period, the value of X in Equation 2 is set to zero. Thus, Equation 2 applied by the anti-G controller 14 is used to counteract the effects of high acceleration rates by controlling the anti-G garment 10 in the same fashion as Equation 1.

In another embodiment, Equation 3 below is used in place of Equation 2 described above.

$$P=1.5\ PSI*Y*(Gz-1.667+X) \quad \text{Equation (3)}$$

where:

Y is nominally a value approximately equal to 1;

X is normally 0;

If Gz<0.5 G for about 2 seconds or longer, then X=0.5;

If Gz<0.0 G for about 2 seconds or longer, then X=1.0;

If Gz<−0.5 G for about 2 seconds or longer, then X=1.5;

The maximum value of X is 1.5; and

The maximum value of P is 11.0 PSI.

The value of Y is nominally a value near 1 used to change the slope of the pressure versus G force response curve. This is useful, for instance, for tailoring the response of the anti-G valve to a specific individual. A tall individual requires a steeper response curve (for instance, a value of Y of 1.05) and a short individual requires a more gradual response (for instance, a value of Y of 0.95).

The value of Y is entered in Equation 3 by the airman as a menu entry prior to flight (by the specific individual airman in an aircraft flown by more than one pilot). Additionally, the Y value could be modified during flight by the airman. When Y is modified in flight, the value is determined based on measurement of the pilot's physiological responses during high-G maneuvers. For instance, a low value of blood pressure at the pilot's neck indicates that additional lower body pressure is needed and the value for Y is increased during subsequent high-G maneuvers.

In a further embodiment, the value for Y is changed as a function of the rate of change of Gz. A faster onset rate translates into a higher value for Y and results in a steeper slope of the pressure versus G response curve. Similarly, the value of Y is adjusted as a function of preceding aircraft maneuvers, and the Gz exposure experienced by the pilot. This is performed in conjunction with changing the value of X to provide an optimized pressure response to Gz exposure.

Because the anti-G controller 14 requires no processing assistance from the existing aircraft computers, retrofit into aircraft capable of inducing the pushpull effect is simplified. Optionally, a signal indicative of anticipated high G force levels from the aircraft computer to anti-G system 11 would provide additional time for delivery of pressure to the anti-G garment 10. The anticipatory signal would be generated if aircraft controls are positioned for an imminent acceleration greater than 5 G and sent over bus 30 to processor 32.

Advantageously, the present invention reduces the pushpull effect on pilots. Additionally, the anti-G system 11 requires no additional processing from aircraft computers and simplifies retrofit into aircraft.

While there have been described and illustrated specific embodiments of the invention, it will be clear that variations in the details of the embodiments specifically illustrated and described may be made without departing from the true spirit and scope of the invention as defined in the appended claims.

What is claimed is:

1. A method of controlling pressure in an anti-G garment worn by an airman, comprising:

storing acceleration signals representative of the acceleration experienced by the airman; and increasing the pressure in the anti-G garment in response to a transition from a period of less than normal G acceleration to greater than normal G acceleration.

2. The method as in claim 1, wherein the pressure in the anti-G garment is increased according to the equation:

P=1.5*(Gz−1.667+X), wherein P is the desired pressure in the anti-G garment, Gz is the amount of G force experienced by the airman and X is a variable value determined by the time history value of Gz.

3. The method as in claim 2, wherein the value of X is determined according to the schedule wherein if Gz<0.5 G for about 2 seconds or longer, then X is 0.5; if Gz<0.0 G for about 2 seconds or longer, then X is 1.0; and if Gz<−0.5 G for about 2 seconds or longer, then X is 1.5.

4. The method as in claim 3, wherein the maximum value of X is 1.5 and the maximum value of P is 11.0 pounds per square inch.

5. The method as in claim 1, further comprising receiving an anticipatory signal indicative of imminent acceleration.

6. The method as in claim 5, further comprising increasing the pressure in the anti-G garment in response to the anticipatory signal.

7. The method as in claim 6, wherein the anticipatory signal is indicative of imminent acceleration in excess of 5 G forces.

8. The method as in claim 1, further comprising venting pressure in the anti-G garment if the pressure in the anti-G garment exceeds a predetermined value.

9. The method as in claim 8, wherein the predetermined value is 11 pounds per square inch.

10. The method as in claim 1, wherein the period of less than normal G acceleration is greater than about 2 seconds.

11. The method as in claim 1, further comprising storing a physique signal representative of the physique of an individual airman.

12. The method as in claim 2, wherein the pressure in the anti-G garment is increased according to the equation:

P=1.5*Y*(Gz−1.667+X), wherein Y is a physique signal representative of the physique of an individual airman.

13. The method as in claim 11, wherein the physique signal is input by the airman.

14. The method as in claim 11, wherein the physique signal is input by sensing the airman's blood pressure in the head or neck region during high G maneuvers.

15. The method as in claim 11, wherein the physique signal varies as a function of the rate of change of G force during said transition period.

16. An apparatus for controlling pressure in an anti-g garment comprising:

a valve controller for increasing and decreasing the pressure in the anti-g garment, the valve controller being responsive to increase and decrease pressure signals;

a processor coupled to the anti-G valve controller; and, a memory coupled to the processor with instructions for calculating a preferred pressure, the instructions when executed by the processor in response to a transition from a period of less than normal G acceleration to greater than normal G acceleration causing an increase in the anti-G garment pressure, the memory being adapted to store G force and garment pressure values over time;

wherein the processor is responsive to signals indicative of acceleration and garment pressure, the processor generating increase and decrease pressure signals in response to execution of instructions from said memory.

17. The apparatus as in claim 16, wherein the instructions for calculating a preferred pressure calculate the pressure according to the equation:

$P=1.5*(Gz-1.667+X)$, wherein P is the desired pressure in the anti-G garment, Gz is the amount of G force experienced by the airman and X is a variable value determined by the time history value of Gz.

18. The apparatus as in claim 17, wherein the value of X is determined according to the schedule wherein if Gz<0.5 G for about 2 seconds or longer, then X is 0.5; if Gz<0.0 G for about 2 seconds or longer, then X is 1.0; and if Gz<−0.5 G for about 2 seconds or longer, then X is 1.5.

19. The apparatus as in claim 18, wherein the maximum value of X is 1.5 and the maximum value of P is 11.0 pounds per square inch.

20. The apparatus as in claim 16, wherein the processor is responsive to anticipatory signals indicative of imminent acceleration.

21. The apparatus as in claim 20, wherein the processor increases the pressure in the anti-G garment in response to the anticipatory signal.

22. The apparatus as in claim 21, wherein the anticipatory signal is indicative of imminent acceleration in excess of 5 G forces.

23. The apparatus as in claim 16, further comprising a pressure switch coupled to the valve controller for venting pressure in the anti-G garment if the pressure in the anti-G garment exceeds a predetermined value.

24. The apparatus as in claim 23, wherein the predetermined value is 11 pounds per square inch.

25. The apparatus as in claim 16, wherein the period of less than normal G acceleration is greater than about 2 seconds.

26. The apparatus as in claim 16, further comprising the memory being adapted to store a physique signal representative of the physique of an individual airman.

27. The apparatus as in claim 17, wherein the instructions for calculating a preferred pressure calculate the pressure according to the equation:

$P=1.5*Y*(Gz-1.667+X)$, wherein Y is a physique signal representative of the physique of an individual airman.

28. The apparatus as in claim 26, wherein the physique signal is input by the airman.

29. The apparatus as in claim 26, wherein the physique signal is input by sensing the airman's blood pressure in the head or neck region during high G force maneuvers.

30. The apparatus as in claim 26, wherein the physique signal varies as a function of the rate of change of G force during said transition period.

31. A system for controlling pressure in an anti-G garment comprising:

a pressure controller for controlling pressure in the anti-G garment;

a storage device for storing a time history of G force signals; and a compensation controller coupled to the storage device for reading the time history of G force signals and coupled to the pressure controller for varying the pressure in the anti-G garment, in response to a transition from a period of less than normal G acceleration to greater than normal G acceleration the compensation controller causing an increase in the anti-G garment pressure.

32. The system as in claim 31, wherein the compensation controller calculates the pressure according to the equation:

$P=1.5*(Gz-1.667+X)$, wherein P is the desired pressure in the anti-G garment, Gz is the amount of G force experienced by the airman and X is a variable value determined by the time history value of Gz.

33. The system as in claim 32, wherein the value of X is determined according to the schedule wherein if Gz<0.5 G for about 2 seconds or longer, then X is 0.5; if Gz<0.0 G for about 2 seconds or longer, then X is 1.0; and if Gz<−0.5 G for about 2 seconds or longer, then X is 1.5.

34. The system as in claim 33, wherein the maximum value of X is 1.5 and the maximum value of P is 11.0 pounds per square inch.

35. The system as in claim 31, wherein the compensation controller is responsive to anticipatory signals indicative of imminent acceleration.

36. The system as in claim 35, wherein the compensation controller increases the pressure in the anti-G garment in response to the anticipatory signal.

37. The system as in claim 35, wherein the anticipatory signal is indicative of imminent acceleration in excess of 5 G forces.

38. The system as in claim 31, further comprising a pressure switch coupled to the pressure controller for venting pressure in the anti-G garment if the pressure in the anti-G garment exceeds a predetermined value.

39. The system as in claim 38, wherein the predetermined value is 11 pounds per square inch.

40. The system as in claim 31, wherein the period of less than normal G acceleration is greater than about 2 seconds.

41. The system as in claim 31, wherein the storage device stores a physique signal representative of the physique of an individual airman.

42. The system as in claim 32, wherein the compensation controller calculates the pressure according to the equation:

$P=1.5*Y*(Gz-1.667+X)$, wherein Y is a physique signal representative of the physique of an individual airman.

43. The system as in claim 41, wherein the physique signal is input by the airman.

44. The system as in claim 41, wherein the physique signal is input by sensing the airman's blood pressure in the head or neck region during high G force maneuvers.

45. The system as in claim 41, wherein the physique signal varies as a function of the rate of change of G force during said transition period.

* * * * *